US010592508B2

(12) United States Patent
Srivastava

(10) Patent No.: US 10,592,508 B2
(45) Date of Patent: Mar. 17, 2020

(54) ORGANIZING DATASETS FOR ADAPTIVE RESPONSES TO QUERIES

(71) Applicant: The Bank of New York Mellon, New York, NY (US)

(72) Inventor: Kumar S. Srivastava, Mountain View, CA (US)

(73) Assignee: The Bank of New York Mellon, New York, NY (US)

( * ) Notice: Subject to any disclaimer, the term of this patent is extended or adjusted under 35 U.S.C. 154(b) by 360 days.

(21) Appl. No.: 15/703,823

(22) Filed: Sep. 13, 2017

(65) Prior Publication Data

US 2018/0075095 A1 Mar. 15, 2018

Related U.S. Application Data

(60) Provisional application No. 62/393,955, filed on Sep. 13, 2016.

(51) Int. Cl.
| | |
|---|---|
| *G06F 16/2453* | (2019.01) |
| *G06F 16/9032* | (2019.01) |
| *G06F 16/23* | (2019.01) |
| *G06F 16/21* | (2019.01) |

(52) U.S. Cl.
CPC ........ *G06F 16/2453* (2019.01); *G06F 16/213* (2019.01); *G06F 16/219* (2019.01); *G06F 16/2358* (2019.01); *G06F 16/90324* (2019.01)

(58) Field of Classification Search
CPC ..... G06F 16/211; G06F 16/213; G06F 16/219
See application file for complete search history.

(56) References Cited

U.S. PATENT DOCUMENTS

| | | | | |
|---|---|---|---|---|
| 7,634,456 B2* | 12/2009 | Yagoub | ................ | G06F 16/217 |
| 8,631,048 B1* | 1/2014 | Davis | .................... | G06F 16/211 |
| | | | | 707/803 |
| 9,886,490 B1* | 2/2018 | Kapoor | ................ | G06F 16/211 |
| 2004/0098425 A1* | 5/2004 | Wiss | ................ | G06F 11/2071 |
| 2005/0091233 A1* | 4/2005 | Friske | ................ | G06F 11/1435 |
| 2005/0228816 A1* | 10/2005 | McCauley | ............ | G06F 16/219 |
| 2006/0123016 A1* | 6/2006 | Ashok | ................ | H04L 41/0803 |

(Continued)

FOREIGN PATENT DOCUMENTS

WO    WO 2007/005744 A2    1/2007

OTHER PUBLICATIONS

PCT International Search Report and Written Opinion, PCT Application No. PCT/US2017/051397, dated Jan. 5, 2018, 11 pages.

*Primary Examiner* — William Spieler
(74) *Attorney, Agent, or Firm* — Fenwick & West LLP

(57) ABSTRACT

A dataset management system organizes datasets and tracks the changes to the dataset to adaptively respond to user queries. For a dataset, the dataset management system tracks the evolving schema of the dataset over time as new data values and/or updates to existing data values are incorporated into the dataset. When a query is received, the dataset management system accesses the schema of a dataset to understand how the dataset has changed over time. Given the changing schema of the dataset, the dataset management system can respond by providing recommendations as to suggested queries that can return improved results. As another option, the dataset management system can execute a query and return results that satisfy the query to the client device that provided the query.

20 Claims, 14 Drawing Sheets

(56) References Cited

U.S. PATENT DOCUMENTS

| | | | |
|---|---|---|---|
| 2006/0294159 A1* | 12/2006 | Dettinger | G06F 16/88 |
| 2007/0294266 A1* | 12/2007 | Chowdhary | G06F 16/283 |
| 2010/0250625 A1* | 9/2010 | Olenick | G06F 16/289 |
| | | | 707/810 |
| 2011/0307501 A1* | 12/2011 | Terwilliger | G06F 16/213 |
| | | | 707/756 |
| 2013/0013568 A1 | 1/2013 | Ben-Dyke et al. | |
| 2013/0018902 A1* | 1/2013 | Vickers | G06F 8/51 |
| | | | 707/756 |
| 2013/0086104 A1 | 4/2013 | Morrison et al. | |
| 2014/0279834 A1* | 9/2014 | Tsirogiannis | G06F 16/211 |
| | | | 707/602 |
| 2015/0121146 A1 | 4/2015 | Mielenhausen | |
| 2016/0055184 A1 | 2/2016 | Fokoue-Nkoutche et al. | |

\* cited by examiner

Combined Dataset 335

Schema 1

| | | | |
|---|---|---|---|
| B_579 | John Smith | 5164893415784642 | 123-45-678 |
| B_654 | Jane Doe | 4681249681685489 | 987-65-432 |
| A_382 | Timothy Johnson | 4681354879632154 | 378-38-840 |
| C_038 | Kerry Oak | 3479165484491621 | 845-41-284 |

FIG. 3B

| | | | |
|---|---|---|---|
| B_579 | John Smith | 5164893415784642 | 123-45-678 |
| B_654 | Jane Doe | 4681249681685489 | 987-65-432 |
| A_382 | Timothy Johnson | 4681354879632154 | 378-38-840 |
| C_038 | Kerry Oak | 3479165484912621 | 845-41-284 |
| Peter Blake | A_480 | 4681354879632154 | 352-86-352 |
| Taylor Jeffries | C_652 | 3435437837745378 | 531-56-581 |

Combined Dataset 355

Schema 1 (columns 1–4), Schema 2 (columns 5–6)

Combined Dataset 370

| | | | Schema 1 | | | Schema 2 | Schema 3 |
|---|---|---|---|---|---|---|---|

| B_579 | John Smith | 5164893415784642 | 123-45-678 |
| B_654 | Jane Doe | 4681249681685489 | 987-65-432 |
| A_382 | Timothy Johnson | 4681354879632154 | 378-38-840 |
| C_038 | Kerry Oak | 3479165484491621 | 845-41-284 |
| Peter Blake | A_480 | 4681354879632154 | 352-86-352 |
| Taylor Jeffries | C_652 | 3435437837455378 | 531-56-581 |
| Johnny Jordy | A_382 | 1234 Lucky Lane | 642-68-4283 |
| Charlene Ing | C_038 | 123 Sunny Drive | 852-03-0468 |

FIG. 3G

Updated Dataset 375

| | | | | Schema 4 | Schema 1 | Schema 2 | Schema 3 |
|---|---|---|---|---|---|---|---|
| | B_579 | John Smith | | 123-45-678 | | | |
| | B_654 | Jane Doe | | 987-65-432 | | | |
| | A_382 | Timothy Johnson | 4681354879632154 | | 378-38-840 | | |
| | C_038 | Kerry Oak | 3479165484491621 | | 845-41-284 | | |
| | Peter Blake | A_480 | 4681354879632154 | | | 352-86-352 | |
| | Taylor Jeffries | C_652 | 3435437837 45378 | | | 531-56-581 | |
| | Johnny Jordy | A_382 | 1234 Lucky Lane | | | | 642-68-4283 |
| | Charlene Ing | C_038 | 123 Sunny Drive | | | | 852-03-0468 |

380 — $505,684 / $30,425

385 — Schema labels

ORGANIZING DATASETS FOR ADAPTIVE RESPONSES TO QUERIES

TECHNICAL FIELD

This disclosure generally relates to dataset processing, and more specifically to a dataset management system that manages new datasets and/or updates to existing datasets such that the dataset management system can adaptively respond to user queries.

BACKGROUND

Developers, analysts, and data scientists (e.g., users) often interact with various systems that can have redundant, incomplete, or changing data. Therefore, it may be difficult to know where to look for data. One solution is to combine data from the various systems; however, each system may implement disparate organizational requirements, representations, and/or structures in organizing their respective data, which makes it cumbersome to combine datasets from different systems. Additionally, data across each of the systems are subject to change, which further complicates how each system handles new data and/or updates to existing data. This inefficient organization of data serves as an obstacle for users that are interested in accessing comprehensive and accurate results that are stored in datasets.

SUMMARY

A dataset management system effectively organizes datasets that may originate from various systems. Through this organizational method, the dataset management system can understand the impact of the changing schemas of a dataset when a new dataset or an update to a dataset occurs. Therefore, when a user query is received, the system can adaptively respond to the user query to account for how the schema of the dataset has changed.

Generally, a schema of a dataset refers to the organization and the presence of data values in the dataset. As an example, the schema of a dataset can describe that a first data value in a first column has a first data type, a second data value in a second column has a second data type, and so on. Data types, examples of which can be a name, a credit card number, an address, a bank account balance, and the like, are determined from attributes of a data value. Examples of attributes of a data value include a string, a Boolean, an integer, and/or a particular formatting of the data value.

In various embodiments, the system receives data values of a new dataset that is to be combined with an existing dataset and determines attributes of the data values. Given the attributes of the data values in a dataset, the system determines a schema that represents the new dataset and determines whether the schema of the new dataset differs from the schema of the existing dataset. If so, the system records the evolution of the schema that reflects the schema change that occurs due to the inclusion of the new dataset. In one embodiment, the evolution of the schema is a dataset lineage map, which is a unidirectional, linked set of records that detail the changes between different versions of the dataset.

The data management system accesses the dataset lineage map in response to queries from a client device for data values in a dataset. For example, the dataset management system evaluates the query by determining whether the query can be executed given how the schema of a dataset has changed over time. In some scenarios, the dataset management system identifies a suggested query given the evolution of the schema of a dataset and therefore, provides the recommendation with the suggested query back to the user. In some scenarios, the dataset management system executes the query across the linked set of records of the dataset lineage map and identifies data values that satisfy the query. The dataset management system returns the results (e.g., identified data values) to the client device in response to the query.

The benefits of the implementation of the various embodiments described herein are several-fold. First, the system detects and tracks changes in the schema of a dataset over time such that the system can adaptively respond to user queries by understanding the schema changes. This adaptive response represents an improvement in comparison to conventional systems which often resort to returning an error message or zero results in response to a poor user query.

Second, the data management system can operate as a central data repository by accumulating datasets from various systems. By doing so, the data management system can reduce computational resources that would otherwise be needed to maintain datasets across disparate data repositories. Furthermore, the data management system can return results in response to user queries that are more comprehensive and accurate in comparison to conventional systems.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3B depicts the combined dataset resulting from the example process shown in FIG. 3A, in accordance with an embodiment.

FIG. 3D depicts the combined dataset resulting from the example process shown in FIG. 3C, in accordance with an embodiment.

FIG. 3F depicts the combined dataset resulting from the example process shown in FIG. 3E, in accordance with an embodiment.

FIG. 3G depicts the updating of data values in the dataset, in accordance with an embodiment.

DETAILED DESCRIPTION

Figure 1:
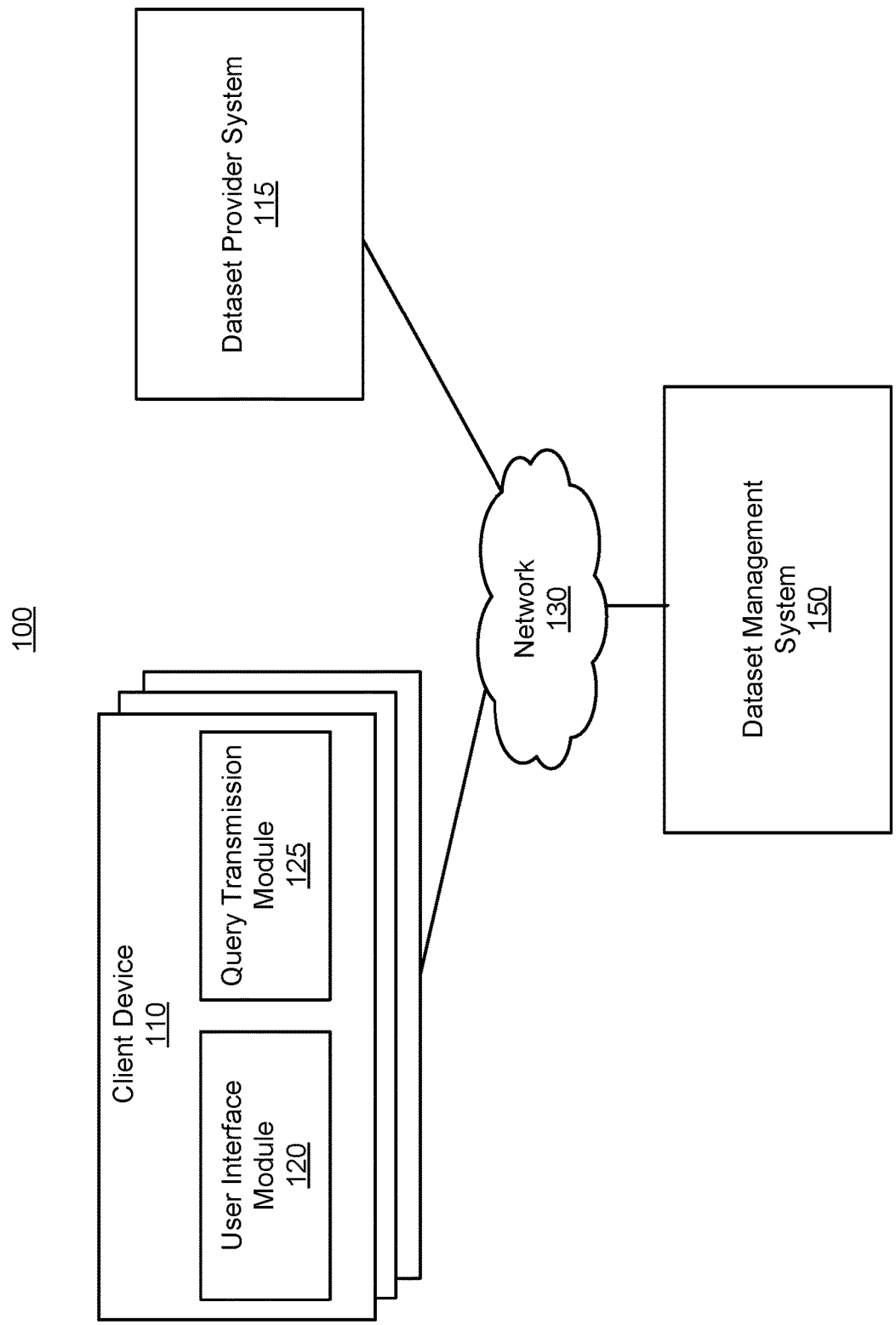
FIG. 1 depicts an overall system environment for the management of datasets that enables the adaptive response to user queries, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "record 420A," indicates that the text refers specifically to the element having that particular reference numeral. A reference numeral in the text without a following letter, such as "record 420," refers to any or all of the elements in the figures bearing that reference numeral (e.g. "record 420" in the text refers to any one or combination of reference numerals "record 420A," "record 420B," "record 420C," and "record 420D" in the figures).

Overall System Environment

FIG. 1 depicts an overall system environment 100 for the management of datasets that enables adaptive responses to user queries, in accordance with an embodiment. The system environment 100 can include one or more client devices 110, a dataset provider system 115, and a dataset management system 150. In some embodiments, more or fewer devices and/or systems are present in the system environment 100. As an example, multiple dataset provider systems 115 may exist in the system environment 100, each of which can provide different datasets to the dataset management system 150.

The dataset management system 150 manages datasets provided by the dataset provider system 115 such that the dataset management system 150 can adaptively respond to queries provided by the client device 110. More specifically, the dataset management system 150 receives datasets and identifies a schema for the dataset. A schema for the dataset is dependent on attributes of individual data values of the dataset. Attributes of a data value can be an object type of the data value (e.g., string, Boolean, number, integer, and the like) or other patterns of the data value (e.g., a number of digits in the data value, an estimated range of values for the data value, a format of the data value, a presence of unique symbols in the data value). Altogether, the schema for the dataset can indicate the organization of attributes extracted from data values in the dataset. For example, a schema can indicate that a first entry in a first row and a first column has a first set of attributes, a second entry in the first row and second column has a second set of attributes, a third entry in the first row and third column has a third set of attributes, and so on.

When changes to the dataset occur, such as when new datasets are incorporated or when data values are updated, the dataset management system 150 identifies changes to the schema of the dataset based on the attributes of the data values in the dataset. If a change to the schema occurs, the dataset management system 150 can record the schema change in a dataset lineage map. Therefore, over time, the dataset management system 150 tracks the evolution of a schema for a dataset.

The dataset management system 150 adaptively responds to queries from the client device 110 by accessing the dataset lineage map. For example, the dataset management system 150 predicts whether datasets that satisfy the query can be returned to the client device 110 by analyzing the schema evolution of each dataset. In some scenarios, instead of returning zero results or an error to the client device 110, the dataset management system 150 can generate and provide a suggested query to the client device 110.

Network

The network 130 facilitates communications between the client device 110, dataset provider system 115, and dataset management system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Dataset Provider System

The dataset provider system 115 is a system that provides data to the dataset management system 150. The dataset provider system 115 can be embodied as a device such as a client device (e.g., a desktop computer). In some embodiments, the dataset provider system 115 is a cloud server or rack server. Although the dataset provider system 115 is depicted as a system independent of the dataset management system 150, in some embodiments, the capabilities of the dataset provider system 115 and the dataset management system 150 are provided by the same system.

The dataset provider system 115 can be associated with an enterprise that holds repositories of data. In various embodiments, such data can include transaction information such as private user information (e.g., name, date/place of birth, address, and the like). Such data can also include an individual's banking information, credit card information, and social security number which are provided to the dataset provider system 115 from a user (e.g., client device 110). Other examples of data can include non-user data such as profits, losses, changes in ownership of financial assets, and the like. In such embodiments, the dataset provider system 115 can take additional security measures to ensure that the data provided to the dataset management system 150 is secured. For example, the dataset provider system 115 can encrypt the dataset such that only the dataset management system 150 can appropriately decode the dataset. Although the examples described herein relate to transactional datasets, in various embodiments, the dataset provider system 115 provides other types of data values and datasets to the dataset management system 150.

In some embodiments, the dataset provider system 115 sends a request to the dataset management system 150, the request specifying new datasets that are being provided to the dataset management system 150. In some embodiments, the request sent by the dataset provider system 115 is an update request with data values that are to replace certain data values stored by the dataset management system 150.

As an example, the dataset provider system 115 sends an update request that includes the new data values as well as information that enables the dataset management system 150 to identify the existing data values that are to be replaced. Such information can be an identification of the existing data values or an identification of the location of the existing data values (e.g., an entry or file directory).

Client Device

The client device 110 may be an electronic device such as a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc. In other embodiments, the client device 110 can work with a cloud server or rack server to perform the functions described below. As an example, the client device 110 can communicate requests to a cloud server, which can generate and provide a query to the dataset management system 150 on behalf of the client device 110.

The client device 110 may execute instructions (e.g., computer code) stored on a computer-readable storage medium. The client device 110 may include one or more executable applications, such as a web browser, to interact with services and/or content provided by the dataset management system 150. In another scenario, the executable application may be a particular application designed by the dataset management system 150 and locally installed on the client device 110. As one particular scenario, a user of the client device 110 may register with the dataset management system 150 using a user identifier and password. Although the embodiment depicted in FIG. 1 shows three client devices 110, in other embodiments the environment 100 may include other numbers of client devices 110.

Generally, a client device 110 enables a user to provide queries to the dataset management system 150 and further enables a user to investigate datasets managed by the dataset management system 150. Referring to the modules of the client device 110, the client device 110 includes a user interface module 120 and a query transmission module 125 for enabling these functions.

The user interface module 120 communicates with an input device that receives user inputs from a user. As one example, the user interface module 120 communicates with a screen, such as a display screen or a touch screen, that receives touch inputs from a user. As another example, the user interface module 120 communicates with a mouse or keyboard. Altogether, a user can provide user inputs for specifying a user query through an input device, which is then communicated to the user interface module 120. The user interface module 120 can provide the user query to the query transmission module 125 to be transmitted to the data management system 150.

The user interface module 120 further provides information to an output device for presentation to the user. As an example, the user interface module 120 can provide, to a display screen, a dataset lineage map that describes how the schema for a dataset has changed over time. In this example, a user can understand how the schema for a dataset has changed, which can influence the user query. As another example, the user interface module 120 may provide, to a display screen, the results that were returned to the client device 110 in response to a query. As a third example, the user interface module 120 can provide, to a display screen, a suggested query returned from the data management system 150 that can guide the user for the submission of a subsequent query.

The query transmission module 125 transmits queries on behalf of the user of the client device 110 to the dataset management system 150. Each query can specify criteria that the data management system 150 uses to identify and return relevant data from data sets. In one embodiment, a criterion may be a data value, such as a name of an individual or a specific credit card number. In one embodiment, a criterion can specify a type of data value (e.g., personal user information such as name, user identifier, address, banking information, credit card number, and social security number or a non-user information such as profits, losses, and transfer in ownership for a financial asset). In one embodiment, a criterion can specify a numerical or non-numerical range for a data value. As an example of a numerical range, the criteria of a query may specify that the first two digits of the credit card number form a number between 51 and 55, which is unique for a particular credit card issuer. As an example of a non-numerical range, the criteria of a query may specify that the first letter of an individual's last name is between two letters in the alphabet. In particular embodiments, the criteria can specify a time range across which the dataset management system 150 is to execute the query. For example, returning to the credit card number example above, the criteria can specify a time range to search for credit cards issued by a particular credit card issuer that were active in the specified time range.

The query transmission module 125 receives responses from the dataset management system 150 in response to the transmitted query. As an example, a response to the transmitted query include data values stored by the dataset management system 150 that satisfy the query. As another example, a response to the transmitted query includes a recommendation of a suggested query. A suggested query may suggest different criteria that would result in the returning of results that are more comprehensive or accurate than the previously provided query.

Dataset Management System

The dataset management system 150 can be one or more electronic devices associated with an enterprise or entity. In some embodiments, the dataset management system 150 can be embodied as a cloud server or rack server. In other words, the functions and algorithms performed by the data management system 150 can be distributed across multiple processors and/or electronic devices. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Generally, the dataset management system 150 receives datasets from the dataset provider system 115 and incorporates the received datasets with existing datasets. In doing so, the dataset management system 150 accounts for schema changes that arise from the incorporation of the received datasets with the existing datasets. For example, if a data value in the dataset is updated, the dataset management system 150 determines the attributes of the updated data value and identifies the data value type based on the attributes. The dataset management system 150 determines whether the schema, which now includes the data value type of the updated data value, has changed as a result of the updated data value. If so, the dataset management system 150 can assign a new schema to the dataset to reflect the change.

The evolution of schema changes can be embodied as a dataset lineage map, which is further used to respond to queries from client devices 110. For example, if the dataset management system 150 receives a query that specifies criteria (e.g., a type of data value, range of data value, or time range), the dataset management system 150 can access the dataset lineage map to determine whether any data values represented in the dataset lineage map satisfy the criteria. If not, the data management system 150 can recommend an updated query with different criteria that would return results. If data values represented in the dataset lineage map satisfy the criteria specified in the query, the dataset management system 150 can process the query and return the results to the client device 110.

Figure 2:
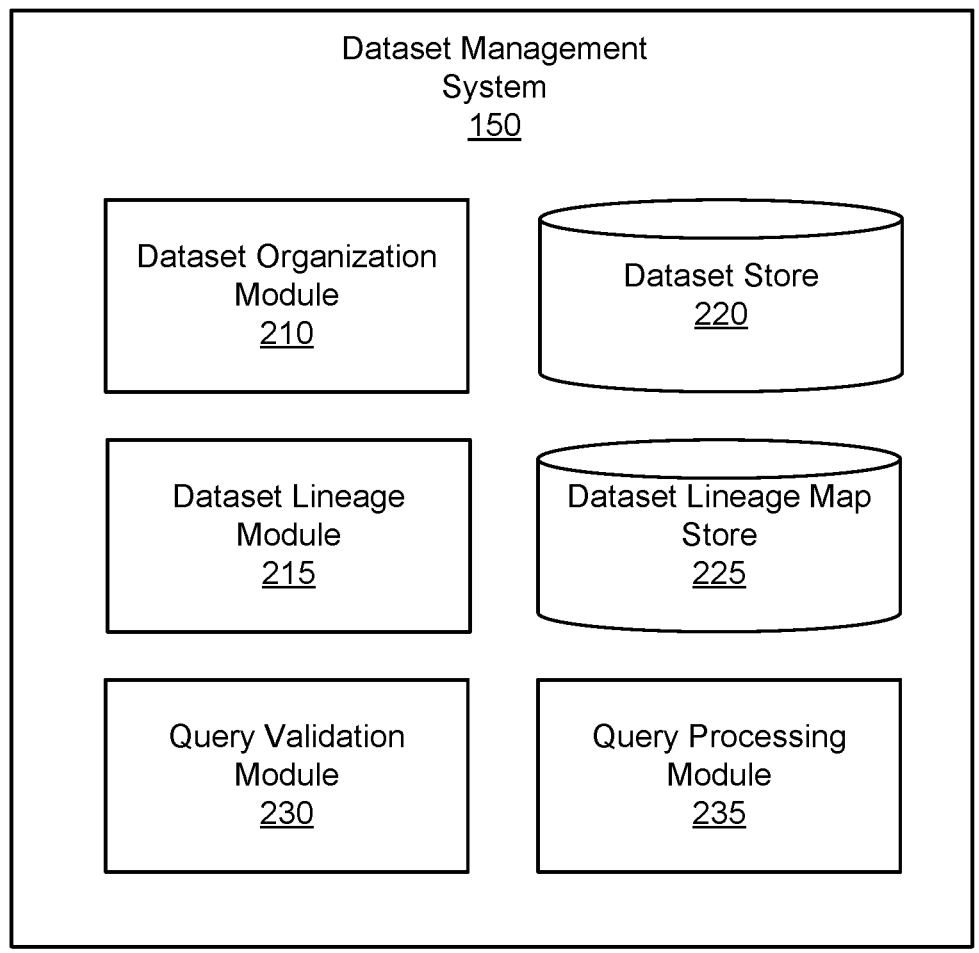
FIG. 2 depicts an example block diagram of the dataset management system, in accordance with an embodiment.

Referring now to FIG. 2, it depicts an example block diagram of a dataset management system 150, in accordance with an embodiment. Here, the dataset management system 150 includes a dataset organization module 210, a dataset lineage module 215, a query validation module 230, a query processing module 235, a dataset store 220, and a dataset lineage map store 225. The operations performed by each module of the dataset management system 150 are described below.

Managing Datasets

Generally, the dataset organization module 210 organizes datasets in view of newly received data values and/or updates to existing datasets. Specifically, the dataset organization module 210 determines the schema of a dataset by extracting attributes of the data values in the dataset and identifying types of the data values based on the extracted attributes. For example, a schema can indicate that a first data value with a first set of extracted attributes is located at a first position in the dataset, a second data value with a second set of extracted attributes is located at a second position in the dataset, and so on. The dataset organization module 210 provides the determined schema of the datasets to the dataset lineage module 215 that tracks the schema evolution of the datasets over time.

Figure 3A:
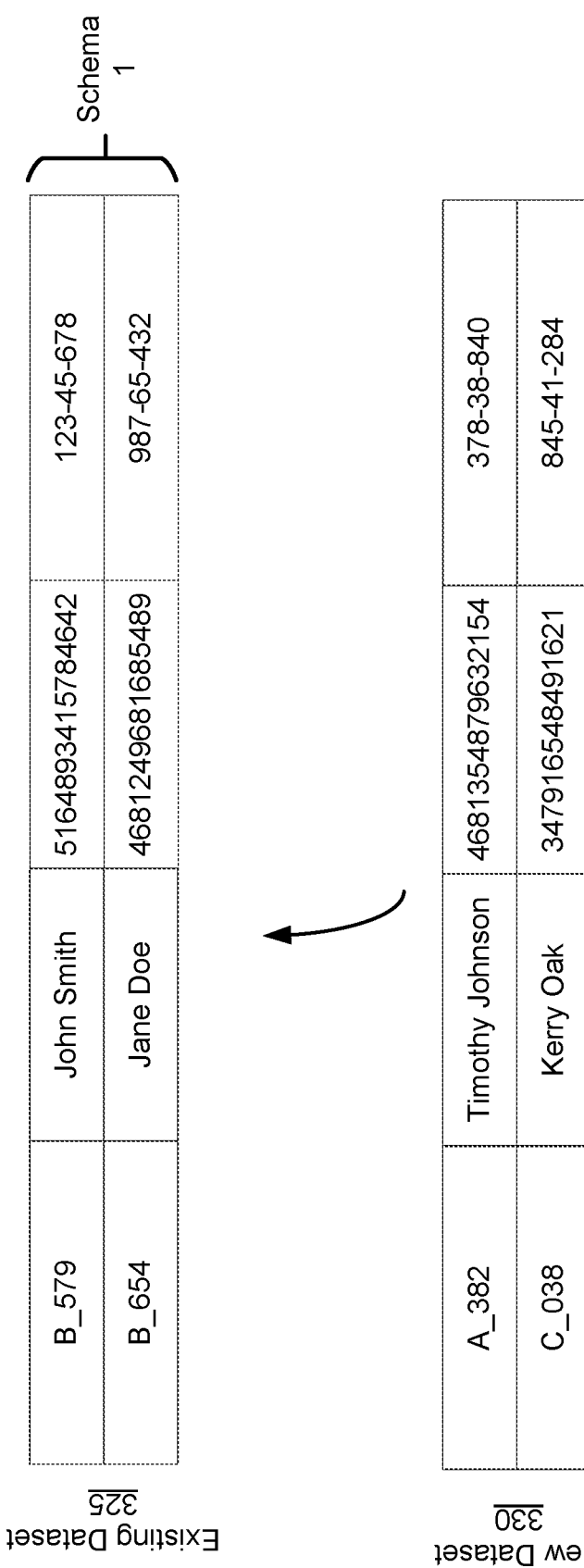
FIG. 3A depicts an example process of incorporating a new dataset into an existing dataset, in accordance with an embodiment.

The dataset organization module 210 manages newly received data values provided by the dataset provider system 115. FIG. 3A depicts an example process of incorporating a new dataset 330 with an existing dataset 325, in accordance with an embodiment. Here, the existing dataset 325 is depicted in FIG. 3A as data values in data entries that are shown in two rows and four separate columns. In various embodiments, such as the embodiment shown in FIG. 3A, each row of the existing dataset 325 includes data values for a particular user. In other embodiments, an existing dataset 325 can be organized and/or visually expressed in a different manner.

Generally, for each entry in the existing dataset 325, the data organization module 210 identifies attributes of the data value in the entry. An attribute of a data value differentiates a type of the data value from other types of data values. An example attribute of a data value may be an object type of the data value (e.g., string, Boolean, number, integer, and the like). Other example attributes of a data value may be a number of digits in the data value, an estimated range of values for the data value, a format of the data value, unique symbols in the data value, the location of unique symbols in the data value, and the like. In various embodiments, more than one attribute can be extracted from and assigned to a data value.

To identify attributes for a data value, the data organization module 210 performs a pattern recognition on the data value. As one example, the data organization module 210 identifies a regular expression (regex) from the sequence of characters in the data value. A regular expression can be any pattern in the data value such as a space between two strings (e.g., for a name) or 15 to 16 numerical digits (e.g., for a credit card number). Therefore, each identified regular expression can serve as the extracted attributes of a data value.

Referring to the first entry in the existing dataset 325 (e.g., B_579), the data organization module 210 extracts a first set of attributes from this first entry. The first set of attributes may identify that the data value "B_579" is a string value, includes an underscore (e.g., "_") at the second position of the string, is five total characters in length, and has a letter as a first character and three numbers as the final three characters. The data organization module 210 can extract a second set of attributes, a third set of attributes, and a fourth set of attributes from the second entry (e.g., "John Smith"), third entry (e.g., "5164893415784462"), and fourth entry (e.g., "123-45-678"), respectively.

Having identified the attributes of each data entry, the data organization module 210 can identify a type corresponding to the data value in the entry. As an example, for the existing dataset 325 shown in FIG. 3A, the data organization module 210 identifies that the data values shown in the first column (e.g., B_579 and B_654) are each a user identifier, the data values shown in the second column (e.g., "John Smith" and "Jane Doe") are each the name of a user, the data values shown in the third column are each a credit card number issued to a user, and the data values shown in the fourth column are each a social security number assigned to a user.

Generally, the data organization module 210 identifies a type of a data value based on the extracted attributes of the data value. In one embodiment, the data organization module 210 performs a hierarchical analysis on the extracted attributes of the data value to identify the data value type. For example, numerous data value types may be expressed as a string (e.g., user name, individual's name, address, credit card number); however, far fewer data value types are expressed as a string and include 15 to 16 numerical digits in the string (e.g., credit card number). The hierarchy of attributes (e.g., rank 1=string/integer/Boolean, rank 2=15-16 numerical digits) can be managed and stored by the dataset management system 115 or, in some embodiments, provided by the dataset provider system 115. Therefore, for a data value, the data organization module 210 first identifies possible data value types based on a first attribute (e.g., rank 1 attributes such as string, Boolean, or integer). Then from amongst these possible data value types, the data organization module 210 further eliminates data value types that do not align with the subsequent attributes of the data value (e.g., rank 2 attributes such as an identification of 15 to 16 numerical digits). Therefore, the data organization module 210 narrows the possible data value types through this hierarchical process and in some embodiments, can identify the likely data value type without having to analyze all extracted attributes for a data value.

In some embodiments, to determine whether a data value type aligns with an extracted attribute, the data organization module 210 accesses stored mappings between extracted attributes and types of data values. For example, a string can be mapped to various data value types such as a user name, individual's name, address, and credit card number where as an identification of 15 to 16 numerical digits is solely mapped to a credit card number. In one embodiment, the mappings are generated by the data organization module 210. In some embodiments, the mappings are provided to the dataset management system 150 from the dataset provider system 115.

Having identified the data type for each data value in the dataset, the data organization module 210 determines a schema, which, in FIG. 3A, corresponds to a row of data values. The schema is determined based on the ordered combination of the data value types in the row. For example, the data organization module 210 can assign schema 1 to each row in the existing dataset 325, because each row has the same ordered combination of the types of data values. In this example, schema 1 can be expressed as:

Schema 1: <User ID, Name, Credit Card Number, Social Security Number>

In other embodiments, a schema can be expressed as the combination of the attributes extracted from data values of each column as opposed to the types of data values. In this embodiment, the data organization module 210 need not identify a type for each set of attributes. Therefore, in this embodiment, schema 1 can be expressed as:

Schema 1:
<First set of attributes, Second set of attributes, Third set of attributes, Fourth set of attributes>

For a new dataset 330, the data organization module 210 also 1) extracts attributes from data values of each entry and 2) determines a schema for each set of data values based on the extracted attributes. Referring to the new dataset 330 in FIG. 3A, the data organization module 210 may identify that entries in the first column each have a first set of attributes that corresponds to a first type of data value (e.g., first type: user ID), data entries in the second column have a second set of attributes that corresponds to a second type of data value (e.g., second type: name), data entries in the third column have a third set of attributes that corresponds to a third type of data value (e.g., third type: credit card number), and the data entry in the fourth column has a fourth set of attributes that corresponds to a fourth type of data value (e.g., fourth type: social security number). The data organization module 210 compares the ordered combination of the types of data values in the new dataset 330 to the schema of the existing dataset 325. Here, the comparison yields a match and therefore, the data organization module 210 also assigns a schema 1 to each row in the new dataset 330. In this case, no new schema is identified for the new dataset, as the new dataset was determined to match the schema of the prior dataset FIG. 3B depicts the combined dataset 335 resulting from the example process shown in FIG. 3A, in accordance with an embodiment. A combined dataset 335 can be stored in the dataset store 220. Here, the existing dataset 325 and new dataset 330 that were depicted in FIG. 3A are now combined into a new combined dataset 335. Specifically, the new dataset 330 has been appended to the existing dataset 325. Based on the analysis described above, the data organization module 210 assigns schema 1 to each row in the combined dataset 335 which reflects that the structure of the data values in each row of the combined dataset 335 is the same.

In some embodiments, in generating the combined dataset 335 by combining the existing dataset 325 and new dataset 330, the data organization module 210 can further perform a check to remove redundant data values with redundant schemas. As an example, given that the schema of the new dataset 330 matches the schema of the existing dataset 325, the data organization module 210 compares the data values of the new dataset 330 against the data values of the existing dataset 325. In this particular example shown in FIG. 3A and 3B, the data organization module 210 determines that the data values in the existing dataset 325 and new dataset 330 are not redundant, and therefore, generates the combined dataset 335 shown in FIG. 3B. In some embodiments, if redundant data values are found, the data organization module 210 removes the redundant data values.

Figure 3C:
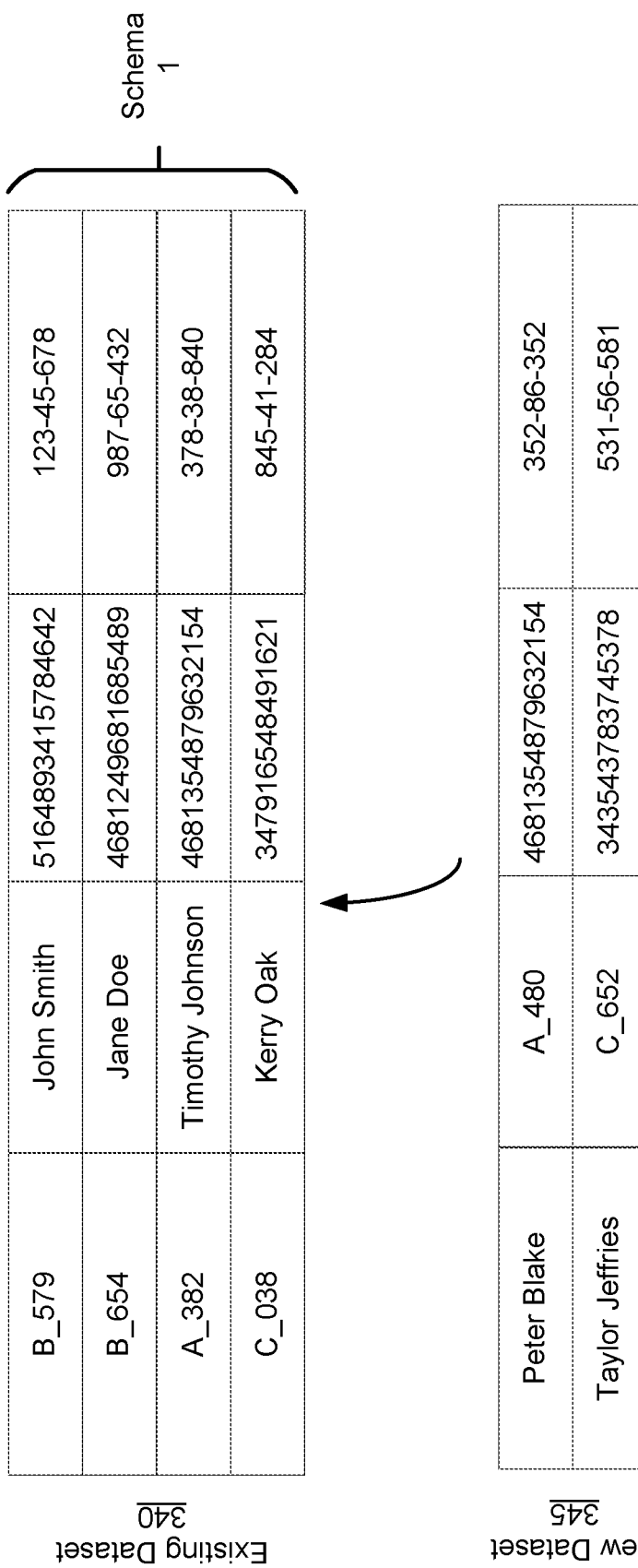
FIG. 3C depicts an example process of incorporating a subsequent new dataset into an existing dataset, in accordance with an embodiment.

FIG. 3C depicts an example process of incorporating a subsequent new dataset 345 into an existing dataset 340, in accordance with an embodiment. In this embodiment, the existing dataset 340 is also the combined dataset 335 shown in FIG. 3B; however, in other embodiments, the existing dataset 340 can be unrelated to the combined dataset 335.

The dataset organization module 210 extracts attributes from each data value in the new dataset 345, identifies a type of each data value based on the extracted attributes, and assigns a schema to the new dataset 345 based on the ordered combination of identified types of data values. Here, the dataset organization module 210 identifies attributes from each data value in the new dataset 345 and can recognize the data values are organized in the following manner: Column 1: Name, Column 2: User ID, Column 3: Credit Card Number, Column 4: Social Security Number.

The dataset organization module 210 compares this ordered combination of the type of data values in the new dataset 345 to schema 1 of the existing dataset 340. Here, the organization of the new dataset 345 differs in comparison to schema 1 of the existing dataset 340 and therefore, the dataset organization module 210 can assign a different schema (e.g., schema 2) to each row of the new dataset 345. Schema 2 can be expressed as:

Schema 2: <Name, User ID, Credit Card Number, Social Security Number>

FIG. 3D depicts the combined dataset 355 resulting from the example process shown in FIG. 3C, in accordance with an embodiment. Based on the analysis described above, the data organization module 210 assigns schema 1 to the first four rows of the combined dataset 355 and schema 2 to the last two rows of the combined dataset 355, thereby indicating that the data values in these rows are differently organized.

Figure 3E:
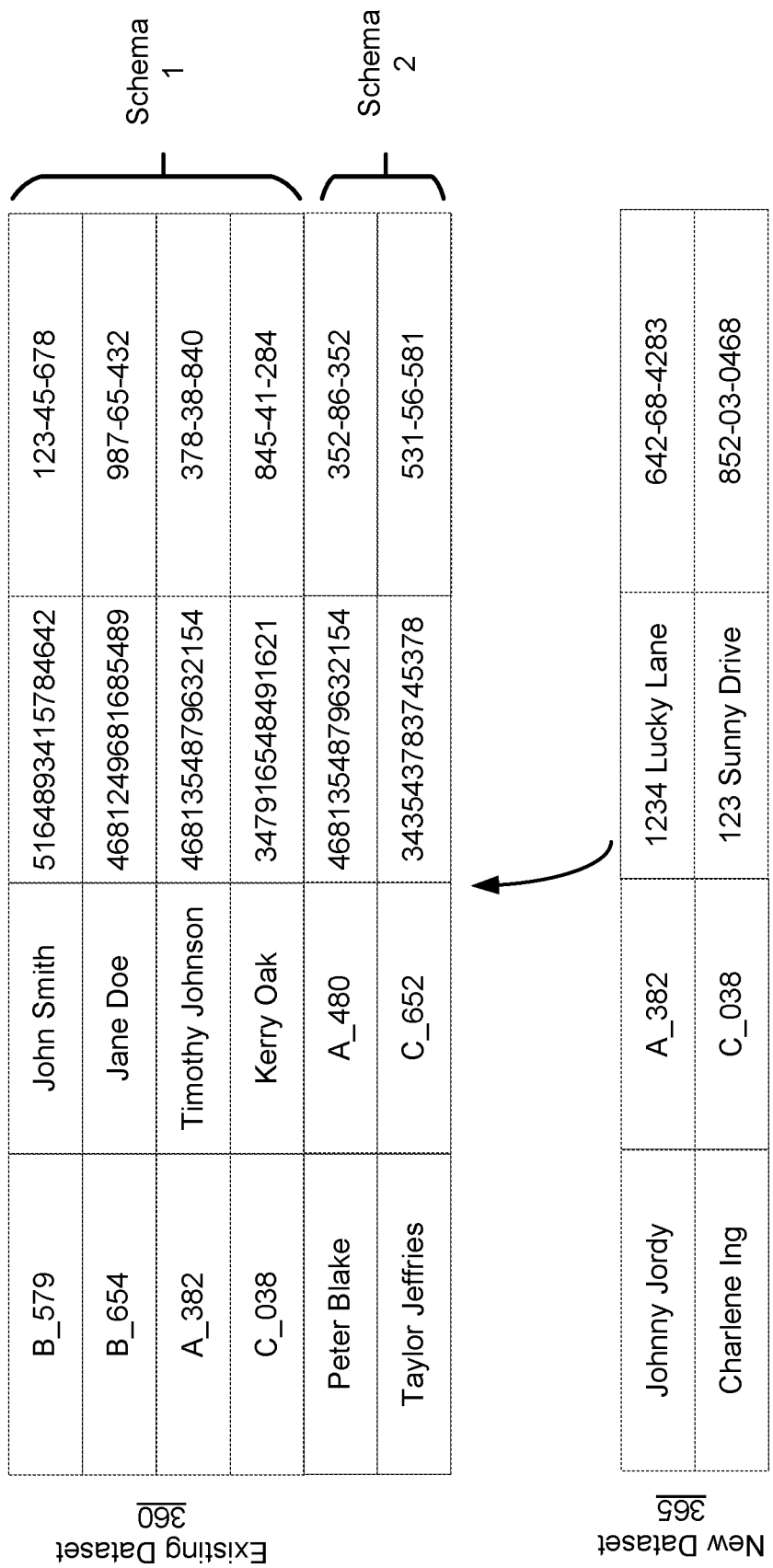
FIG. 3E depicts an example process of incorporating a subsequent new dataset into an existing dataset, in accordance with an embodiment.

FIG. 3E depicts an example process of incorporating a subsequent new dataset 365 into an existing dataset 360, in accordance with an embodiment. In this embodiment, the existing dataset 360 is also the combined dataset 355 shown in FIG. 3D; however, in other embodiments, the existing dataset 360 can be unrelated to the combined dataset 355.

The dataset organization module 210 extracts attributes from each data value in the new dataset 365 and identifies a type of each data value based on the extracted attributes. Here, the third column of the new dataset 365 can include data values that each correspond to an address of an individual. The dataset organization module 210 extracts attributes from these address data values. Example attributes of the address data values (e.g., "1234 Lucky Lane") includes an indication that the data value is a string value, a combination of a number followed by words, and/or that the last word in the data value is one commonly associated with addresses (e.g., "Lane").

The dataset organization module 210 recognizes that these extracted attributes do not correspond to a type of data value that currently exists in the existing dataset 360. Therefore, in some embodiments, the dataset organization module 210 can automatically assign a new schema to the rows of the new dataset 365 because the existing schema (e.g., schema 1 and schema 2) would not match with the schema of the new dataset 365. In this example, the data organization module 210 assigns the new dataset 365 with schema 3. Schema 3 can be expressed as:

Schema 3: <Name, User ID, Address, Social Security Number>

In some embodiments, instead of automatically assigning a new schema to rows of the new dataset 365, the dataset organization module 210 compares the identified types of data values for the new dataset 365 to the schema (e.g., schema 1 and schema 2) of the existing dataset 360 and determines that the schema for the new dataset 365 does not exist. Therefore, the data organization module 210 assigns schema 3 to the rows of the new dataset 365.

FIG. 3F depicts the combined dataset 370 resulting from the example process shown in FIG. 3E, in accordance with an embodiment. Based on the analysis described above, the data organization module 210 assigns schema 1 to the first four rows of the combined dataset 370, schema 2 to the next two rows of the combined dataset 370, and schema 3 to the last two rows that correspond to the most recently received dataset (e.g., new dataset 365), thereby indicating that in these rows with differing schema, the organization of data values are different.

In addition to managing newly received data, the dataset organization module 210 manages data values that are to replace existing data values in the dataset. FIG. 3G depicts the updating of data values in the dataset, in accordance with an embodiment. Here, the dataset organization module 210 receives a request to update certain data values in the existing dataset, such as combined dataset 370 (shown in FIG. 3F). The received request may include new data values that are to replace existing data values in the existing dataset as well as information that identifies the existing data values that are to be replaced. In the example shown in FIG. 3G, a received request includes the new data values 380 of ("$505,684" and "$30,425") as well as an identification of the data entry (e.g., first row, third column and second row, third column). Alternatively, the received request may specify the existing data values to be replaced (e.g., the credit card numbers shown in FIG. 3F).

The dataset organization module 210 replaces the existing data values with the new data values to generate the updated dataset 375 and determines how the schema for the updated dataset 375 has changed. For example, for the updated rows in which data values have been replaced, the data organization module 210 extracts attributes from the new data values and reevaluates the ordered combination of the types of data in the updated row. Based on the reevaluation, if the schema of the updated row matches a schema of an existing row, the data organization module 210 assigns the same schema to the updated row. Alternatively, as is the case in the example shown in FIG. 3G, the dataset organization module 210 determines that the schema of the updated row does not match the schema of an existing row. Therefore, the dataset organization module 210 assigns a new schema, such as schema 4 (385), to the updated row. Schema 4 can be expressed as:

Schema 4: <Name, User ID, Account Balance, Social Security Number>

In this example, the different rows of data values in updated dataset 375 are assigned four different schemas that reflect the different organization of each row of data values.

Generating a Record in the Dataset Lineage Map

The dataset lineage module 215 tracks the evolution of the different schema of a dataset over time. In some embodiments, the evolution of schema of a dataset is represented through a dataset lineage map that includes individual records, each record describing the schema of a dataset at a particular point in time. The dataset lineage map may be a directionally linked set of records representing the dataset. Each time the schema of a dataset changes, the dataset lineage module 215 generates a new record that is added to the dataset lineage map.

Figure 4:
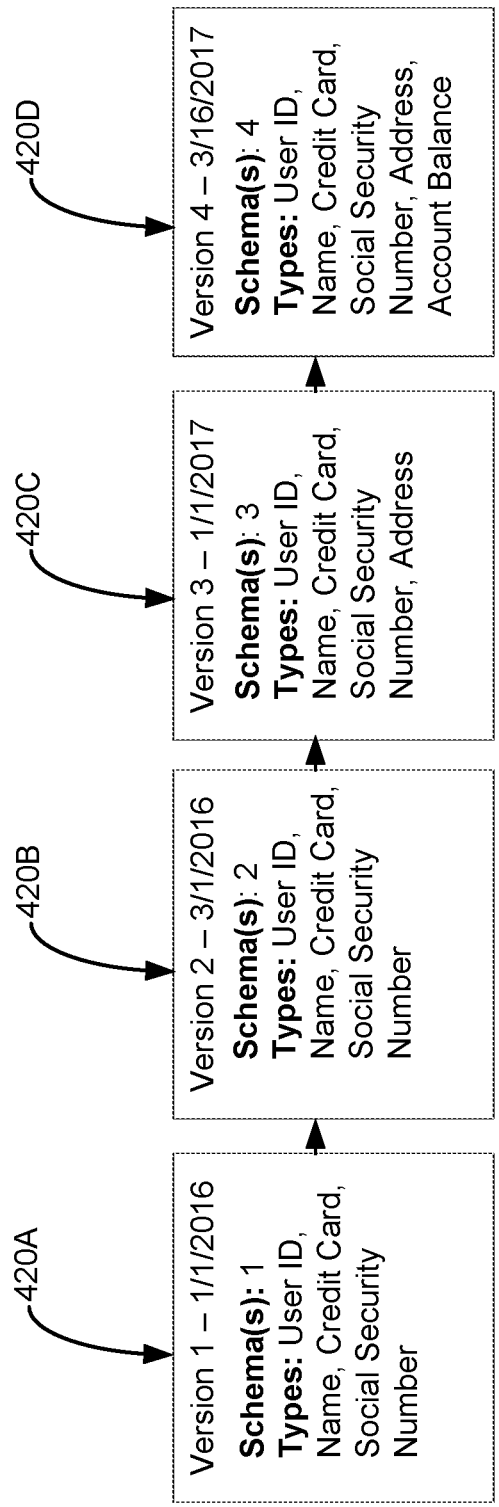
FIG. 4 depicts an example dataset lineage map for a dataset, in accordance with an embodiment

Reference is now made to FIG. 4, which depicts an example dataset lineage map 400 for a dataset, in accordance with an embodiment. Further reference will be made to the previous examples shown in FIG. 3A-3G. In FIG. 4, the dataset lineage map 400 includes four separate records (420A, 420B, 420C, and 420D). Each record 420 represents a version of the dataset. For example purposes, record 420A is generated in response to the combination of existing dataset 325 and new dataset 330 (see FIG. 3A/3B), record 420B is generated in response to the combination of existing dataset 340 and new dataset 345 (see FIG. 3C/3D), record 420C is generated in response to the combination of existing dataset 360 and new dataset 365 (see FIG. 3E/3F), and record 420D is generated in response to the generation of updated dataset 375 (see FIG. 3G).

Generally, a record 420 includes information describing the version of the dataset, such as the schema of the dataset. Therefore, records can be compared to one another to determine how the schema of a dataset changes over time. Specifically, a record 420 can identify one or more of a version number of the dataset, dates corresponding to the version of the dataset, the number of schemas in the dataset, data types of the schemas, changes in the schema (e.g., added schemas, deleted schemas) for the current dataset in comparison to previous versions of the dataset, changes in values in the dataset (e.g., added values, deleted values, replaced values), extracted attributes corresponding to the schemas, changes (e.g., addition, deletion, rename) of attributes, and reasons for schema changes.

FIG. 4 depicts one example of records 420 that each includes a version number, a date of creation, total number of schemas, and types of data values described by the schemas. Specifically, record 420A includes one schema (e.g., schema 1) and includes the data types of "User ID," "Name," "Credit Card," and "Social Security Number," which also corresponds to the combined dataset 335 of FIG. 3B. Record 420B indicates a total of two schemas (e.g., schema 1 and schema 2) and includes the same four data types of "User ID," "Name," "Credit Card," and "Social Security Number," which also corresponds to the combined dataset 355 of FIG. 3D. Record 420C indicates a total of three schemas (e.g., schema 1, schema 2, and schema 3) and includes the addition of a fifth type of data value (e.g., "Address"), which corresponds to the combined dataset 370 of FIG. 3F. Record 420D indicates a total of four schemas (e.g., schema 1, schema 2, schema 3, and schema 4) and includes the addition of a sixth data type (e.g., "Account Balance"), which corresponds to the updated dataset 375 of FIG. 3G.

In various embodiments, instead of indicating the types of data values of a dataset, each record 420 indicates the extracted attributes of the dataset and/or the range of values for each of the extracted attributes. Therefore, the types of data values of the dataset can be determined from the extracted attributes and/or range of values of each extracted attribute indicated by each record 420.

In some embodiments, a record 420 can include additional details of a dataset in comparison to the record 420 shown in FIG. 4. For example, a record 420 can be expressed as the following:

Version Number: 4
Version Start Date: 3/16/2017 23:12:00

Version End Date: Present
Present Schemas: Schema 1, Schema 2, Schema 3, Schema 4
Schema Additions: Schema 4
Schema Deletions: None
Column Value Additions: Col3("$505,684", "30,425")
Column Value Deletions: Col3("5164893415784642", "4681249681685489")
Schema Attributes:
{Schema 1(Attributes 1, Attributes 2, Attributes 3, Attributes 4),
Schema 2(Attributes 1, Attributes 2, Attributes 3, Attributes 4),
Schema 3(Attributes 1, Attributes 2, Attributes 3, Attributes 4),
Schema 4(Attributes 1, Attributes 2, Attributes 3, Attributes 4)}

The dataset lineage module 215 stores the dataset lineage map 400 for a dataset in the dataset lineage map store 225. Given that the dataset lineage map 400 tracks the schema evolution of a dataset, the dataset lineage map 400 can be retrieved and accessed to understand the historical and current organization of data values in a dataset in an efficient manner without retrieving the dataset contents.

In one embodiment, the dataset lineage module 215 may retrieve and provide the dataset lineage map 400 to a client device 110. Therefore, a user of the client device 110 can inspect the schema evolution of a dataset across time. In another embodiment, the dataset lineage map 400 can be accessed for the purpose of responding to a user query, which is described in further detail below.

Responding to a User Query

The query validation module 230 receives queries and determines whether a query can be processed as requested. Specifically, the query validation module 230 receives a query and performs a validation process to verify that the query may be performed given the schema changes for the data requested by the query. Generally, the query validation module 230 accesses the dataset lineage map 400 and determines whether results can be returned in response to the query given the schema evolution of datasets documented by the dataset lineage map 400. In one embodiment, if at least one result satisfies the criteria of the query and can be returned, the query validation module 230 enables the query processing module 235 to proceed with processing the query. In other embodiments, the query validation module 230 allows the query to be processed if a threshold number of results that satisfy the criteria of the query can be returned.

In some embodiments, during the validation process, the query validation module 230 identifies recommended criteria for a suggested query based on the schema evolution detailed in the dataset lineage map 400. The query validation module 230 can provide the recommended criteria to the client device 110 such that a user of the client device 110 can provide an updated query that includes the recommended criteria. In various embodiments, the query validation module 230 identifies and provides recommended criteria to the client device 110 while also enabling the query processing module 235 to process a query.

As used hereafter, a suggested query specifies the recommended criteria and represents an improvement over the prior query submitted by the client device 110. As one example, a suggested query with recommended criteria would return an improved set of results in comparison to results that would be returned for the prior query. An improved set of results may be a more comprehensive set of results (e.g., instead of returning zero results) or a more refined set of results (e.g., instead of returning excessive number of results). As another example, a suggested query with recommended criteria can be processed more efficiently by the query processing module 235 in comparison to the prior query.

Figure 5A:
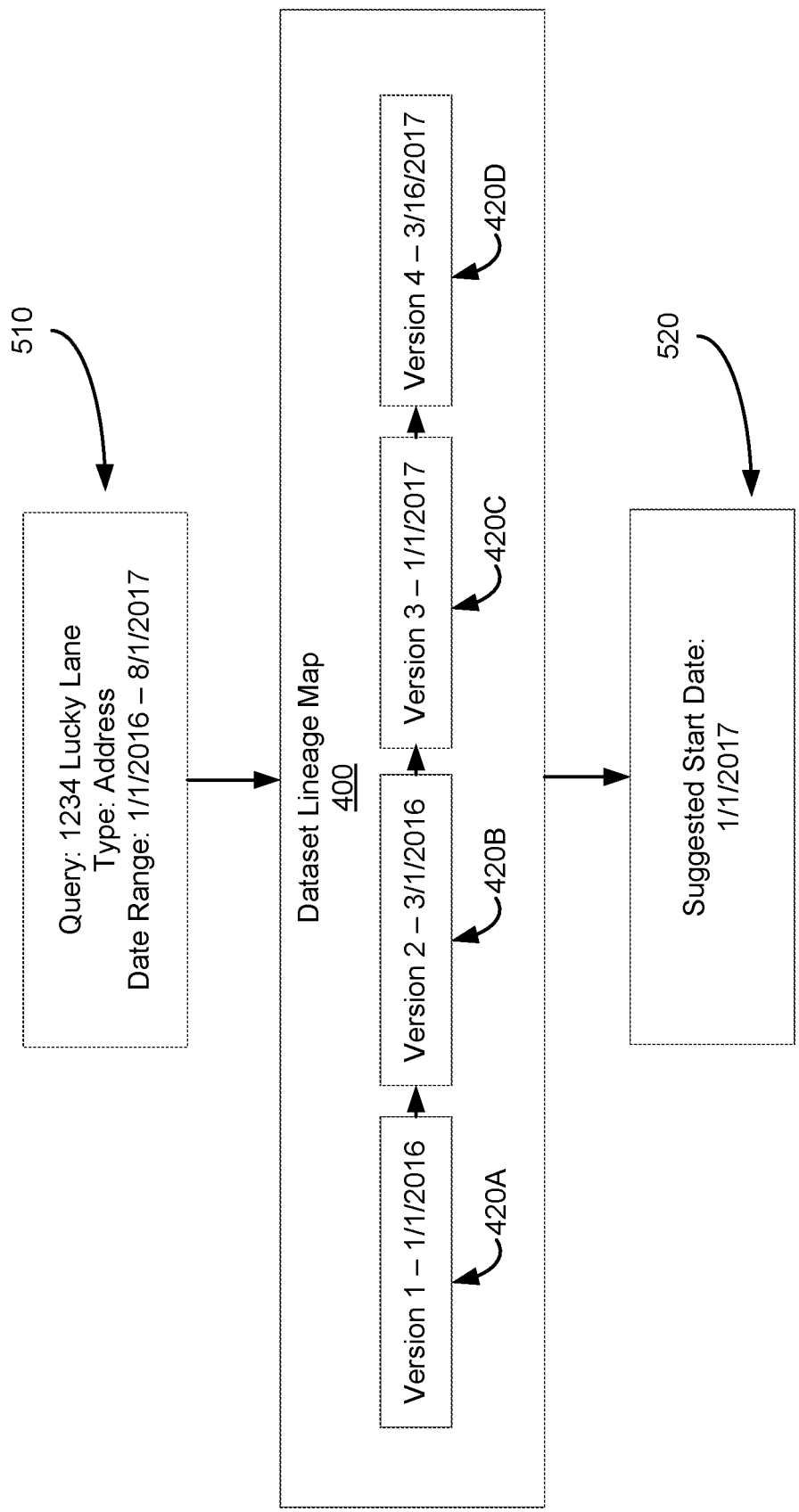
FIG. 5A depicts an example process of validating a query using a dataset lineage map, in accordance with an embodiment.

To provide a more specific example, reference is now made to FIG. 5A, which depicts an example process of validating a query 510 using the dataset lineage map 400, in accordance with an embodiment. As described above in relation to the query transmission module 125, a query 510 originates from a client device 110 and can specify a data value. Additionally, the query 510 can specify criteria such as a type of data value, and/or a range (e.g., numerical range, non-numerical range, date range). For example, query 510 shown in FIG. 5A specifies a type of data value corresponding to an address. Additionally, query 510 shown in FIG. 5A specifies a date range of Jan. 1, 2016 to Aug. 1, 2017 across which the query is to be processed.

The query validation module 230 accesses the dataset lineage map 400 and identifies records 420 in the dataset lineage map 400 that satisfy at least a first criteria, such as the date range, of the query 510. Here, given that the date range in the query 510 encompasses each record 420 of the dataset lineage map 400, the query validation module 230 identifies all records 420 in the dataset lineage map 400. For each record 420, the query validation module 230 accesses the schemas of the dataset that are available in the record 420. Therefore, by accessing the schemas, the query validation module 230 can quickly understand whether data values exist in the dataset that satisfy criteria of the query 510.

In the example shown in FIG. 5A, the query validation module 230 accesses the schemas of the records 420 (see FIG. 4) and recognizes that the address data type is not available in the schemas of record 420A and record 420B. Instead, the address data type is only available in the schemas of record 420C and 420D. Therefore, the query validation module 230 can understand the presence or absence of data values in each dataset corresponding to a record 420 by investigating changes to the schema without accessing individual data values in each dataset. Here, the query validation module 230 may identify a recommended criterion 520, which is a suggested start date of Jan. 1, 2017 that corresponds to the date where the address data type is first available in record 420C. Here, a query with the recommended criterion 520 (e.g., new suggested start date) can be processed more effectively by the query processing module 235 as only datasets that include the relevant data type need to be searched through.

Figure 5B:
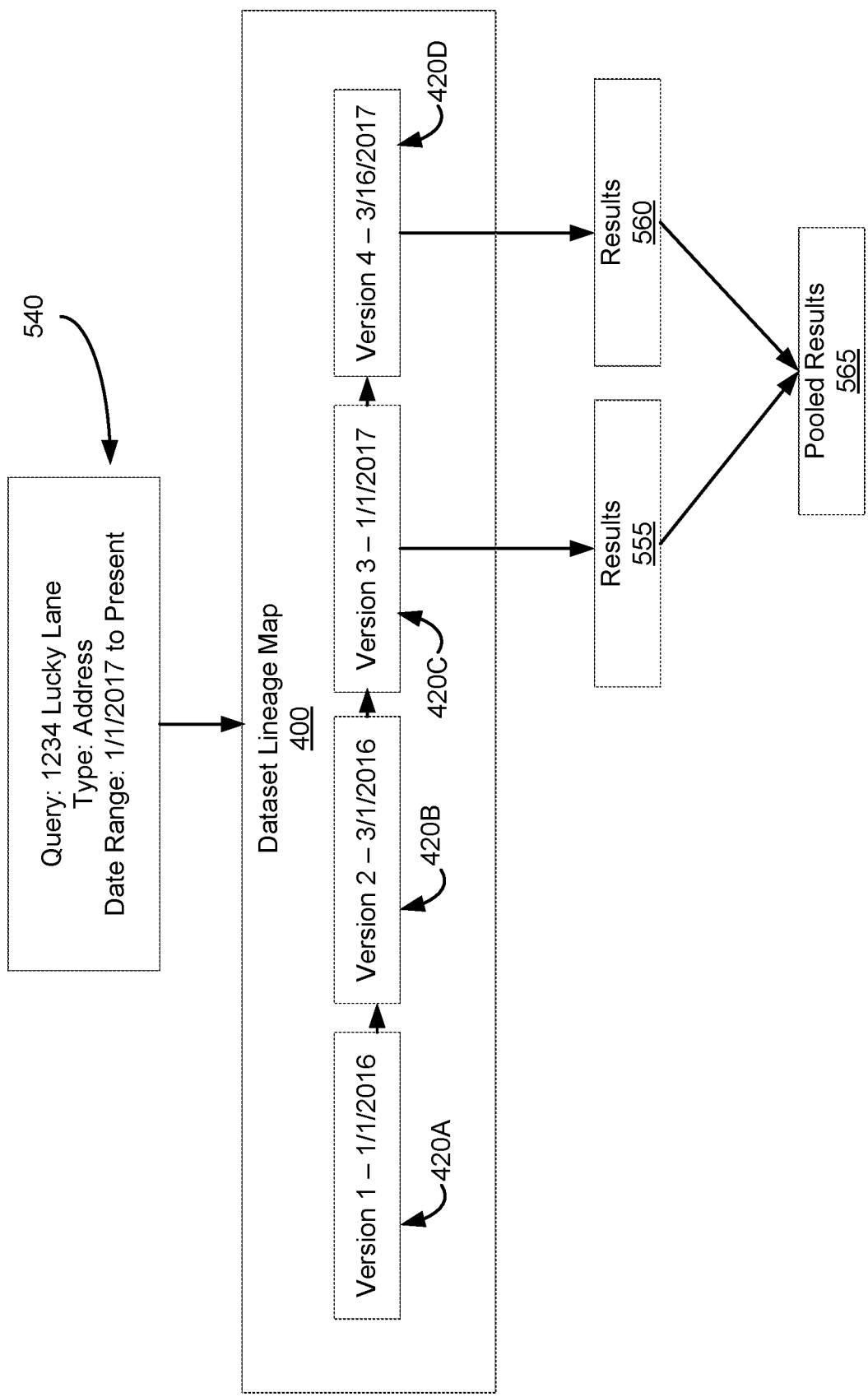
FIG. 5B depicts an example process of validating a query using a dataset lineage map and parallel processing the query, in accordance with an embodiment.

Reference is now made to FIG. 5B, which depicts an example process of validating a query 540 using a dataset lineage map 400 and parallel processing the query 540, in accordance with an embodiment. In this example, the received query 540 can be received from the client device 110 after the query validation module 230 provided the suggested query that includes the recommended criterion 520 (e.g., the new start date of Jan. 1, 2017). In other examples, the received query 540 need not be a suggested query and can be independent of any prior queries submitted by the client device 110.

The query validation module 230 validates the query 540. As described above, the query validation module 230 identifies the records 420 that satisfy a criteria of the query 540, such as the date range. Here, the query validation module 230 identifies record 420C and record 420D which satisfy the date range criteria. Furthermore, record 420C and record 420D both include schemas that indicate the presence of data values that correspond to the address data type. Therefore, the query validation module 230 completes the validation process and enables the query processing module 235 to process the query 540 across the identified records 420C and 420D.

In various embodiments, the query processing module 235 parallel processes the query across the datasets represented by each identified record (e.g., record 420C and 420D). Given that each identified record 420C and 420D describes the schema of the dataset, the query processing module 235 can search the relevant data entries in the dataset without searching the entirety of the dataset. For example, returning to the combined dataset 370 shown in FIG. 3F, the query processing module 235 accesses the three different schema assigned to different portions of the combined dataset 370. As described above, three different schema may be represented as:

Schema 1: <User ID, Name, Credit Card Number, Social Security Number>
Schema 2: <Name, User ID, Credit Card Number, Social Security Number>
Schema 3: <Name, User ID, Address, Social Security Number>

Therefore, by accessing the schemas of the combined dataset 370, the query processing module 235 can quickly identify that the $3^{rd}$ entry of each of the final two rows are the address data type and can search those two data entries to determine whether they satisfy the query 540. Here, the data value "1234 Lucky Lane" exists in the combined dataset 370. Returning to FIG. 5B, the query processing module 235 returns results 555 from this dataset represented by record 420C that includes the data value. The query processing module 235 can perform a similar process of identifying results 560 from the dataset represented by record 420D by accessing the schemas of the dataset represented by record 420D. The query processing module 235 combines the results 555 and 560 to generate a pooled results 565. As one example, the query processing module 235 can append results 560 to results 555 such that the pooled results 565 are chronologically ordered. The query processing module 235 can provide the pooled results 565 back to the client device 110 for viewing.

Process for Managing Datasets and Responding to user Queries

Figure 6:
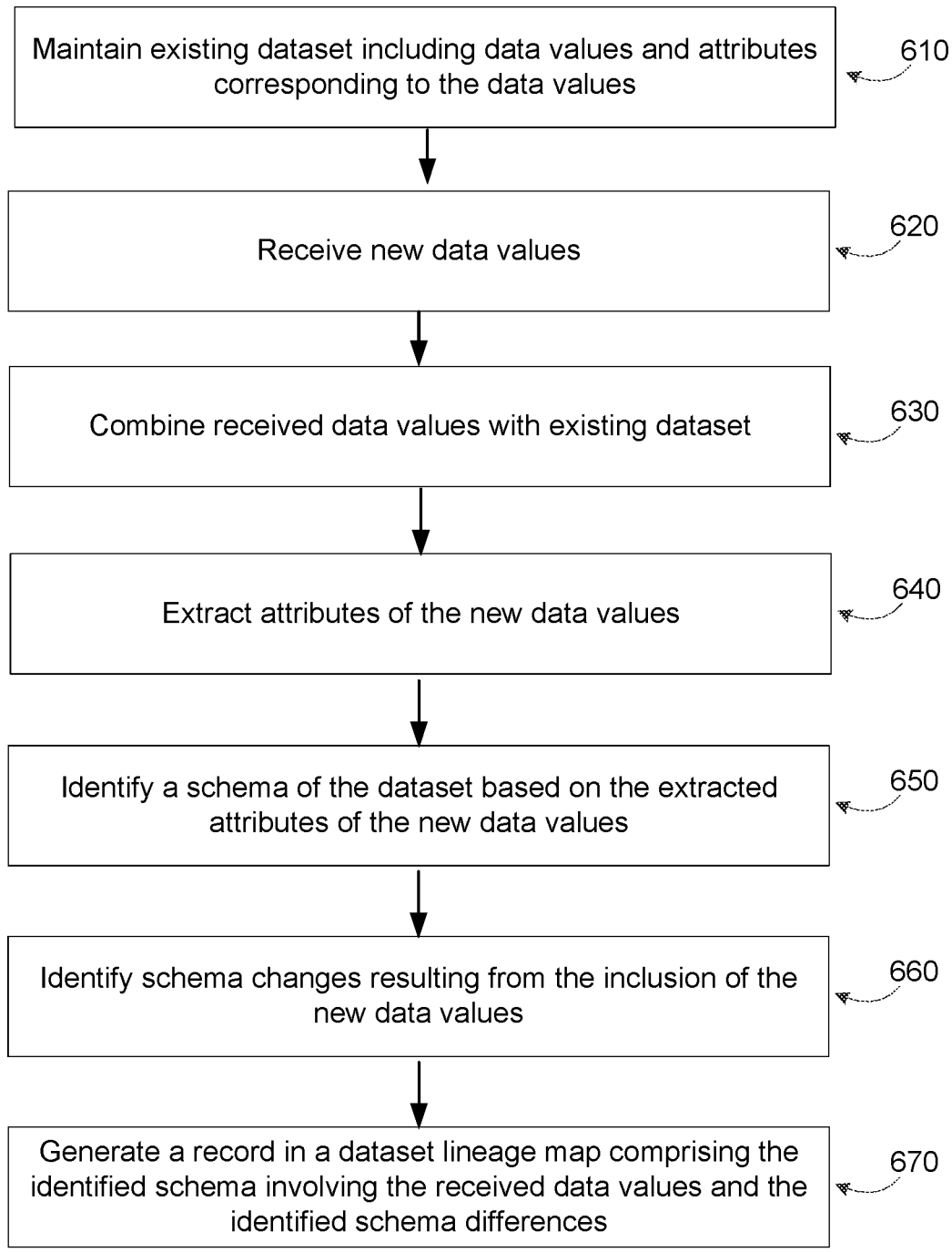
FIG. 6 is an overall flow process for managing datasets through a dataset lineage map, in accordance with an embodiment.

FIG. 6 is an overall flow process for managing datasets through a dataset lineage map, in accordance with an embodiment. The dataset management system 150 can maintain 610 a dataset that includes data values and attributes corresponding to the data values of the dataset. Additionally, the different portions of the dataset can be assigned different schema, each schema indicating the organization of the portion of the dataset.

The dataset management system 150 receives 620 new data values. In one embodiment, new data values are included as a part of a new dataset. In some embodiments, new data values are included in an update request for replacing one or more existing data values in the existing dataset. The dataset management system 150 combines 630 the received data values with the existing dataset to generate a combine dataset. For the new data values, the dataset management system 150 extracts 640 attributes of the new data values. Such attributes can be descriptive of the new data values or can uniquely identify the new data values.

The dataset management system 150 identifies 650 a schema of the combined dataset based on at least the extracted attributes of the new data values. For example, the dataset management system 150 replaces an existing data value in a row of an existing dataset with a new data value to generate a combined dataset. The dataset management system identifies the schema of the row of the combined dataset, given the attributes of the new data value that is now included in the row. In one embodiment, the dataset management system 150 uses the extracted attributes of the new data values to identify a likely type of data value and identifies the schema of the combined dataset based on the identified type of data value of the new data values.

The dataset management system 150 identifies 660 changes to the schema of the combine dataset that is a result of the inclusion of the new data values. For example, if the new data values caused the dataset management system 150 to assign a new schema or to delete an existing schema, the dataset management system 150 identifies these changes (e.g., addition/deletion). To track the schema evolution of the dataset, the dataset management system 150 generates 670 a record in a dataset lineage map. The generated record includes the identified schema that involved the new data values. Additionally, the generated record includes the identified changes to the schema of the dataset. The dataset management system 150 adds the record to the dataset lineage map such that the schema evolution of the dataset can be tracked over time by accessing the directionally linked records of the dataset lineage map.

Figure 7:
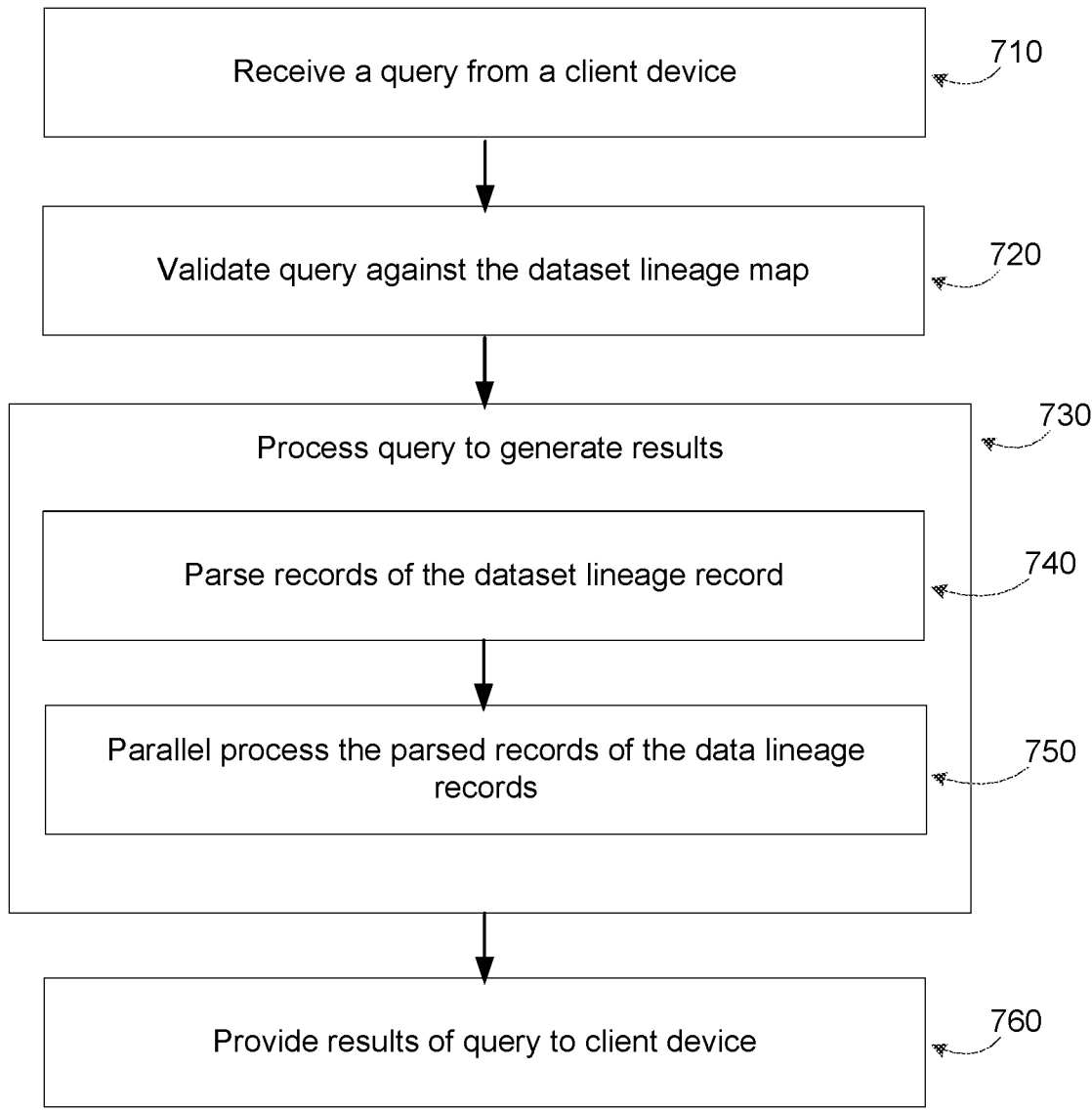
FIG. 7 depicts an overall flow process for validating and processing a query using the dataset lineage map, in accordance with an embodiment.

FIG. 7 depicts an overall flow process for validating and processing a query using the dataset lineage map, in accordance with an embodiment. The dataset management system 150 receives 710 a query from a client device 110 and validates 720 the query against the dataset lineage map. As an example, the dataset management system 150 accesses records of the dataset lineage map and further accesses details of the schema of each record to determine whether results (e.g., data values) that satisfy criteria of the query exist in the dataset.

In one embodiment, the dataset management system 150 successfully validates the query and processes 730 the query to generate results. Specifically, the dataset management system 150 can parse 740 the records of the dataset lineage record that each satisfy a criterion, such as a date range, provided in the query. For each record that satisfies the criteria, the dataset management system 150 parallel processes 750 the parsed records to identify results. The dataset management system 150 provides 760 the identified results of the query back to the client device 110.

In some embodiments, the dataset management system 150 validates a query and in the process, determines that the query can be updated with recommended criteria which would lead to improved results. If so, the dataset management system 150 provides the recommended criteria to the client device 110 as a suggestion. In such embodiments, the dataset management system 150 may receive a subsequent query from the client device 110 that includes the recommended criteria. Thus, the dataset management system 150 can proceed through steps 720, 730, 740, 750, and 760 and provide the improved results to the client device 110 in response to the subsequent query.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving new data values for storage with a dataset;
   for each new data value, extracting attributes of the new data value, at least one attribute describing a pattern in the new data value;
   identifying a schema for the dataset based on the determined attributes of the new data values;
   adding the identified schema to a dataset lineage map describing a set of schemas for the dataset;
   receiving a query from a client device for data values of the dataset, the query specifying a data value type; and
   validating the query against the dataset lineage map, the validation comprising:
   determining whether the dataset includes the data value type specified by the query by accessing the identified schema for the dataset.

2. The method of claim 1, further comprising:
   combining the received dataset with an existing dataset; and
   identifying schema changes between the identified schema involving the new data values and a schema of an existing dataset.

3. The method of claim 2, wherein adding the identified schema to a dataset lineage map further comprises adding the identified schema changes between the identified schema and the schema of the existing dataset to the dataset lineage map.

4. The method of claim 1, wherein each schema in the set described by the dataset lineage map is associated with a time range for which the schema represents a current version of the dataset.

5. The method of claim 1, further comprising:
   responsive to determining that the dataset includes the data value type specified by the query, generating results for the query; and
   providing the generated results to the client device.

6. The method of claim 5, wherein generating results for the query comprises:
   identifying one or more schemas described by the dataset lineage map that each correspond to a time range that is within a time range specified by the query; and
   generating results for the query from datasets corresponding to the identified one or more schemas.

7. The method of claim 6, wherein generating results for the query further comprises:
   parallel processing the datasets corresponding to the identified one or more schemas to generate individual results for each dataset; and
   combining the individual results for each dataset to generate results for the query.

8. The method of claim 1, further comprising:
   responsive to determining that the dataset does not include the data value type specified by the query, providing a suggested query to the client device.

9. The method of claim 8, wherein providing a suggested query to the client device further comprises:
   identifying an additional schema in the set described by the dataset lineage map that includes the data type specified by the query; and
   generating a suggested query comprising a recommended criteria, wherein the additional schema satisfies the recommended criteria of the suggested query and the identified schema for the dataset does not satisfy the recommended criteria of the suggested query.

10. The method of claim 9, wherein the query from the client device specifies a first date range and wherein the recommended criteria specifies a second date range, wherein the second date range is narrower than the first date range.

11. The method of claim 9, further comprising:
    receiving an updated query from the client device, the updated query specifying the recommended criteria previously provided to the client device in the suggested query.

12. A non-transitory computer-readable storage medium comprising computer code that, when executed by a processor, causes the processor to:
    receive new data values for storage with a dataset;
    for each new data value, extract attributes of the new data value, at least one attribute describing a pattern in the new data value;

identify a schema for the dataset based on the determined attributes of the new data values;

add the identified schema to a dataset lineage map describing a set of schemas for the dataset;

receive a query from a client device for data values of the dataset, the query specifying a data value type; and validate the query against the dataset lineage map, wherein the computer code that causes the processor to validate the query further comprises computer code that, when executed by the processor, causes the processor to:

determine whether the dataset includes the data value type specified by the query by accessing the identified schema for the dataset.

13. The non-transitory computer-readable storage medium of claim 12, further comprising computer code that, when executed, causes the processor to:

combine the received dataset with an existing dataset; and identify schema changes between the identified schema involving the new data values and a schema of an existing dataset.

14. The non-transitory computer-readable storage medium of claim 13, wherein the computer code that causes the processor to add the identified schema to a dataset lineage map further comprises computer code that, when executed, causes the processor to:

add the identified schema changes between the identified schema and the schema of the existing dataset to the dataset lineage map.

15. The non-transitory computer-readable storage medium of claim 12, wherein each schema in the set described by the dataset lineage map is associated with a time range for which the schema represents a current version of the dataset.

16. The non-transitory computer-readable storage medium of claim 12, further comprising computer code that, when executed by the processor, causes the processor to:

responsive to the determination that the dataset includes the data value type specified by the query, generate results for the query; and provide the generated results to the client device.

17. The non-transitory computer-readable storage medium of claim 16, wherein the computer code that causes the processor to generate results for the query further comprises computer code that, when executed by the processor, causes the processor to:

identify one or more schemas described by the dataset lineage map that each correspond to a time range that is within a time range specified by the query; and generate results for the query from datasets corresponding to the identified one or more schemas.

18. The non-transitory computer-readable storage medium of claim 17, wherein the computer code that causes the processor to generate results for the query further comprises computer code that, when executed by the processor, causes the processor to:

parallel process the datasets corresponding to the identified one or more schemas to generate individual results for each dataset; and combine the individual results for each dataset to generate results for the query.

19. The non-transitory computer-readable storage medium of claim 12, further comprising computer code that, when executed by the processor, causes the processor to:

responsive to the determination that the dataset does not include the data value type specified by the query, provide a suggested query to the client device.

20. The non-transitory computer-readable storage medium of claim 19, wherein the computer code that causes the processor to provide a suggested query to the client device further comprises computer code that, when executed by the processor, causes the processor to:

identify an additional schema in the set described by the dataset lineage map that includes the data type specified by the query; and generate a suggested query comprising a recommended criteria, wherein the additional schema satisfies the recommended criteria of the suggested query and the identified schema for the dataset does not satisfy the recommended criteria of the suggested query.

* * * * *